US009714706B1

(12) United States Patent
Szawarski et al.

(10) Patent No.: US 9,714,706 B1
(45) Date of Patent: Jul. 25, 2017

(54) DRIVER INTERFACE WITH INFERRED PARK LOGIC

(71) Applicant: Ford Global Technologies, LLC, Dearborn, MI (US)

(72) Inventors: Hubert Szawarski, Waterford, MI (US); Mark A. Cuddihy, New Boston, MI (US); Craig Pattinson, Highland, MI (US); Thomas Overbeck, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/186,708

(22) Filed: Jun. 20, 2016

(51) Int. Cl.
*F16H 63/48* (2006.01)
*F16H 63/34* (2006.01)
*F16H 59/12* (2006.01)
*F16H 59/08* (2006.01)

(52) U.S. Cl.
CPC ......... *F16H 63/3458* (2013.01); *F16H 59/08* (2013.01); *F16H 59/12* (2013.01); *F16H 63/48* (2013.01); *F16H 63/3416* (2013.01)

(58) Field of Classification Search
None
See application file for complete search history.

(56) References Cited

U.S. PATENT DOCUMENTS 2,333,115 A * 11/1943 Neracher ............ F16H 61/0211 475/303
6,300,868 B1 10/2001 Barr
7,204,785 B2 4/2007 Berger et al.
8,413,784 B2 4/2013 Giefer et al.
2010/0326787 A1* 12/2010 Giefer ..................... B60T 7/085 192/220.2
2015/0025750 A1* 1/2015 Weslati .................. B60W 10/11 701/48
2015/0344004 A1* 12/2015 Al-Regib ................ B60T 1/062 701/51

FOREIGN PATENT DOCUMENTS

EP 1845495 A1 10/2007
JP 2012220020 A 11/2012
KR 1020070034755 A 3/2007

* cited by examiner

*Primary Examiner* — Justin Holmes
(74) *Attorney, Agent, or Firm* — James Dottavio; Brooks Kushman P.C.

(57) ABSTRACT

A vehicle driver interface eliminates the need for the direct driver selection of a park mode. Instead, a park mechanism is automatically engaged in response to either a transition into an ignition Off state, or detection of the absence of a driver. The park mechanism is released in response to selection of a drive mode, which can be either a forward drive mode or a reverse drive mode. To permit idling with the driver present, an electronic park brake is automatically engaged when the vehicle comes to a stop in a drive mode, and is automatically released when the driver taps the accelerator pedal. A stay-in-neutral mode overrides the automatic engagement of the park mechanism or the electronic parking brake to permit operations such as towing the vehicle.

15 Claims, 6 Drawing Sheets

FIG. 1 – PRIOR ART

DRIVER INTERFACE WITH INFERRED PARK LOGIC

TECHNICAL FIELD

This disclosure relates to the field of vehicle/driver interfaces. More particularly, the disclosure pertains to a driver interface without a driver manipulatable park control.

BACKGROUND

FIG. 1 schematically illustrates a rear wheel drive vehicle powertrain and driver interface. Bold solid lines represent mechanical power flow connections such as shafts. Dashed lines represent the flow of information signals. For clarity, power flow paths and signals not impacted by the present invention may be omitted from FIG. 1. Engine 10 generates power by burning fuel. Starter 12 uses electrical energy from a battery to accelerate the engine to a speed at which the combustion process can be sustained. Transmission 14 establishes a variety of power flow paths with various speed and torque ratios between the engine crankshaft and a transmission output shaft to adapt the power to current vehicle needs. Specifically, transmission 14 is an automatic transmission in which a controller manages the engagement and disengagement of clutches and/or other measures to switch among available power flow paths and to adjust the transmission ratio. Differential 16 splits the power from the transmission output shaft between left and right rear wheels 18 and 20, permitting slight speed differences such as when the vehicle turns a corner. Front wheels 22 and 24 are not powered. A four wheel drive powertrain may include a transfer case which diverts some or all power from the transmission output shaft to the front wheels. A front wheel drive powertrain drives the front wheels as opposed to the rear wheels. In a front wheel drive powertrain, the transmission and differential may be combined into a single housing.

Brakes 26, 28, 30, and 32 selectively restrain wheels 18, 20, 22, and 24 respectively. Typically, the brakes are engaged in response to a driver depressing brake pedal 34. The torque capacity of the brakes varies in response to the degree of pedal depression and/or the force exerted on pedal 34. Electronic Park Brake (EPB) 36 may be engaged to hold the current level of torque capacity of at least one of the brakes even after brake pedal 34 is released. Transmission 14 also includes a park mechanism. A park mechanism is a mechanism designed to hold the vehicle stationary for an indefinite period without consuming any power. Typically, the park mechanism includes a park pawl which engages a park gear on the transmission output shaft. The park pawl is generally not designed to engage the park gear when the vehicle is moving at a speed higher than a relatively low threshold speed. The park mechanism may include features to delay engagement if the mechanism is triggered at a speed higher than the threshold speed.

A driver controls the operation of the powertrain by interacting with various controls. As discussed below, the driver controls the starting and stopping of the engine by manipulating ignition controls including keyfob sensor 38 and start/stop button 40. Keyfob sensor 38 determines whether an electronic keyfob is present within the vehicle, such as in a driver's pocket or purse. The driver selects the desired transmission range using a range selector 42. Range selector 42 may include buttons for various transmission modes such as buttons 44, 46, 48, and 50. Once a driver range is selected, the driver controls the wheel torque using accelerator pedal 48 (for positive torque) and brake pedal 34 (for negative torque). The driver activates operation of the Electronic Park Brake using button 52. Feedback regarding the current status of the powertrain is provided to the driver by display 54. Controller 56 sends signals to control various powertrain components based on driver manipulation of the controls listed above and on other sensors. These other sensors may include a vehicle speed sensor 58.

SUMMARY OF THE DISCLOSURE

A vehicle includes an automatic transmission, a park mechanism, a driver actuated ignition control, a range selector, and a controller. The range selector provides for driver selection of a neutral mode and a drive mode, but does not provide for direct driver selection of a park mode. The drive mode may be a reverse drive mode or a forward drive mode. The range selector may consist of, for example, a reverse selection button, a neutral selection button, and a forward selection button. The controller automatically engages the park mechanism in response to selection of an ignition Off state via the driver actuated ignition control. The controller may also automatically engage the park mechanism in response to a driver presence sensor detecting the absence of a driver. If an ignition Off state is selected or driver absence if detected while the vehicle is moving, the controller may delay engagement of the park mechanism until vehicle speed decreases below a threshold. The controller may release the park mechanism in response to selection of the drive mode. The controller may inhibit engagement of the park mechanism in response to driver selection of a stay-in-neutral mode even if the ignition Off state is selected or absence of a driver is detected. The controller may also automatically engage an electronically actuated park brake in response to the vehicle stopping while in the drive mode.

A vehicle driver interface includes a driver-operable range selector and a driver-operable ignition control. The driver-operable range selector provides for direct selection of a forward drive mode, a reverse drive mode, and a neutral mode, but does not provide for direct selection of a park mode. The ignition control is configured to transition between an ignition on state and an ignition Off state. A park mode is established by a controller in response to a transition into the ignition Off state. The park mode may also be established in response to detecting the absence of a driver. The controller may delay establishment of the park state until the vehicle speed decreases to less than a threshold. The controller may also engage an electronic parking brake in response to the vehicle stopping while in the drive mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
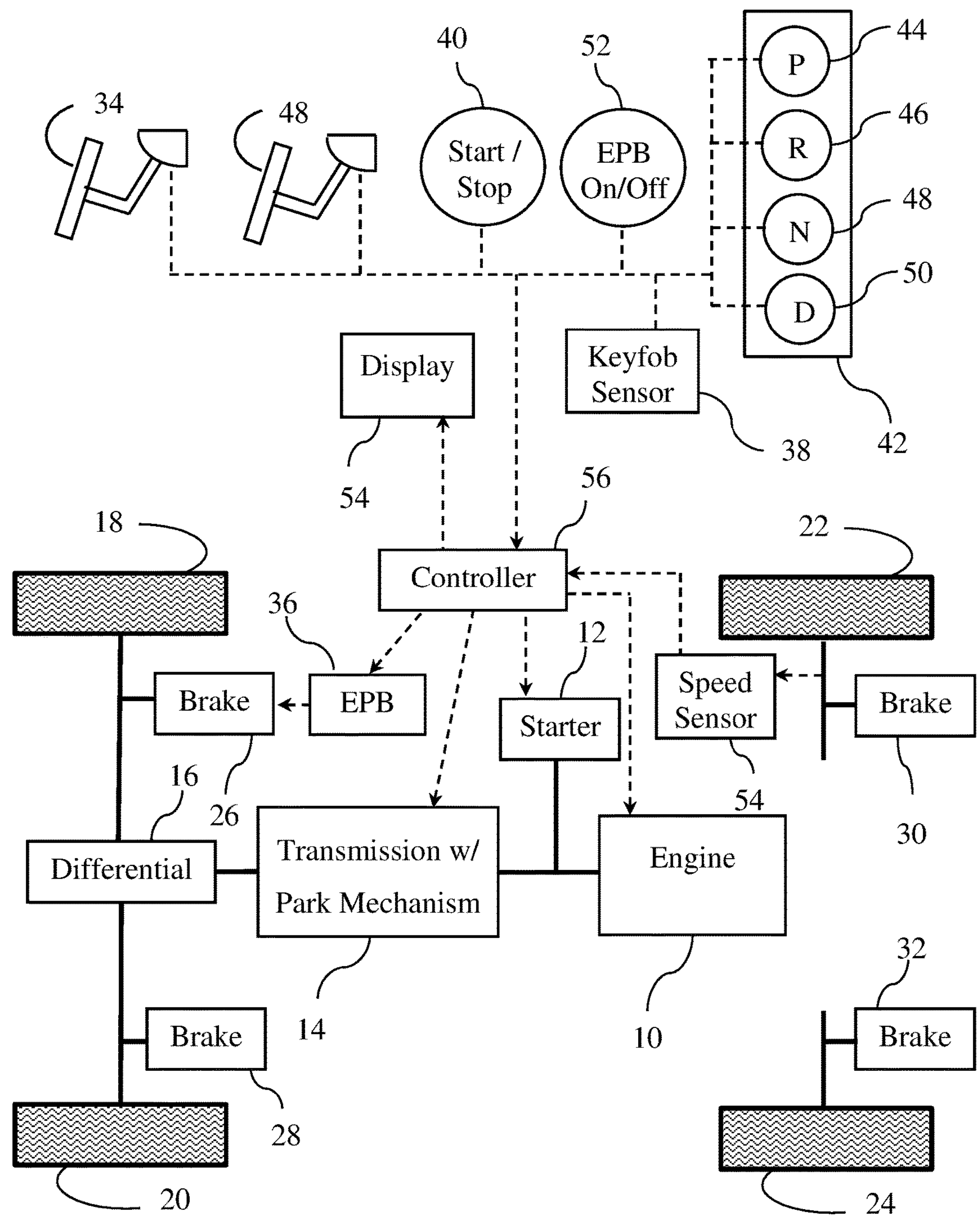
FIG. 1 is a schematic illustration of a prior art vehicle and user interface.
Figure 2:
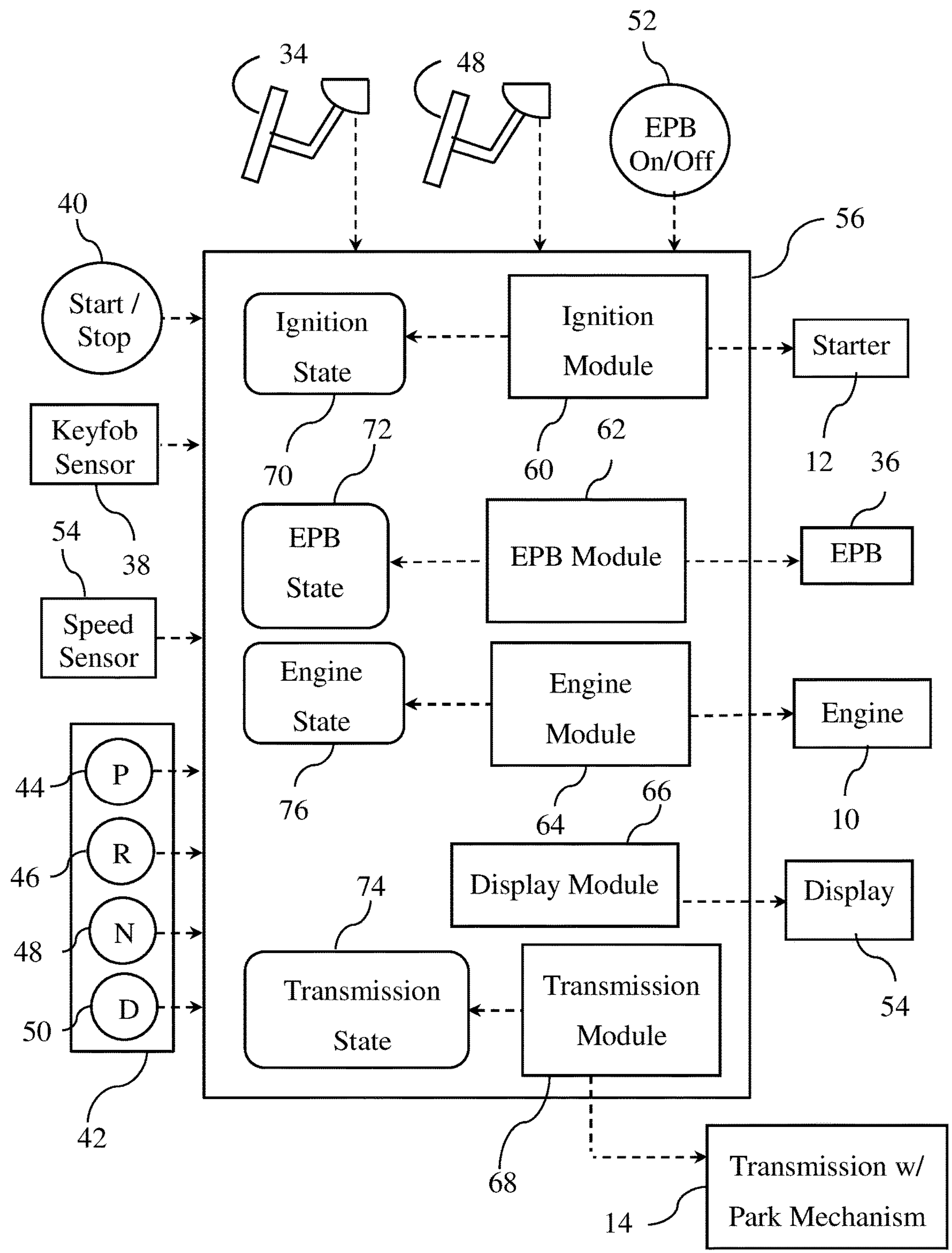
FIG. 2 is a schematic illustration of a logical structure of a controller suitable for use in the vehicle and user interface of FIG. 1.

FIG. 2 schematically illustrates a logical structure for controller 56 of FIG. 1. The controller includes five different control modules: ignition module 60, EPB module 62, engine module 64, display module 66, and transmission module 68. The control modules may be implemented in a variety of ways, including multiple processors, a single processor executing separate control threads, or a single processor executing a single control thread. Each module has access to each of the sensor signals, although each module may only utilize a fraction of these signals. Several of the modules also produce state information which is available to the other modules.

Ignition module 60 controls operation of starter 12. Ignition module 60 also sets ignition state 70 to one of ignition on, ignition Off, and accessory. An embodiment of such an ignition module may utilize signals from Start/Stop button 40, keyfob sensor 38, and brake pedal 34. EPB module 62 controls operation of electronic parking brake 36 and sets EPB state 72 to one of EPB engaged and EPB disengaged. An embodiment of such an EPB module may utilize signals from EPB On/Off button 52, speed sensor 54, brake pedal 34, accelerator pedal 48, and transmission state 74. Engine module 64 controls operation of engine 10 and sets engine state 76. Display module 66 controls operation of display 54. An embodiment of such a display module may utilize the states 70, 72, 74, and 76 to determine what to display to the driver.

Transmission module 68 controls operation of transmission 14 and sets transmission state 76. The set of transmission states include park, neutral, reverse, and forward. Alternatively, the transmission state may indicate which forward gear ratio ($1^{st}$, $2^{nd}$, $3^{rd}$, etc.) is presently engaged instead of simply indicating forward. An embodiment of such a transmission module may utilize signals from range selector 42, speed sensor 54, brake pedal 34, and accelerator pedal 48. For example, transmission module 68 may issue commands to engage particular clutches to establish a reverse gear ratio in response to depression of R button 46. Similarly, transmission module 68 may issue commands to engage clutches to establish a $1^{st}$ forward gear ratio in response to depression of D button 50 and then may command shifts in response to signals from speed sensor 54 and accelerator pedal 48. In response to depression of N button 48, the controller may disengage clutches such that no power flow path through the transmission is established. Transmission controller 68 may engage the parking pawl of the transmission in response to depression of P button 44 and may disengage the pawl in response to depression of any of the other three buttons. For safety, the other three buttons may be disabled while the parking pawl is engaged unless brake pedal 34 is depressed.

Figure 3:
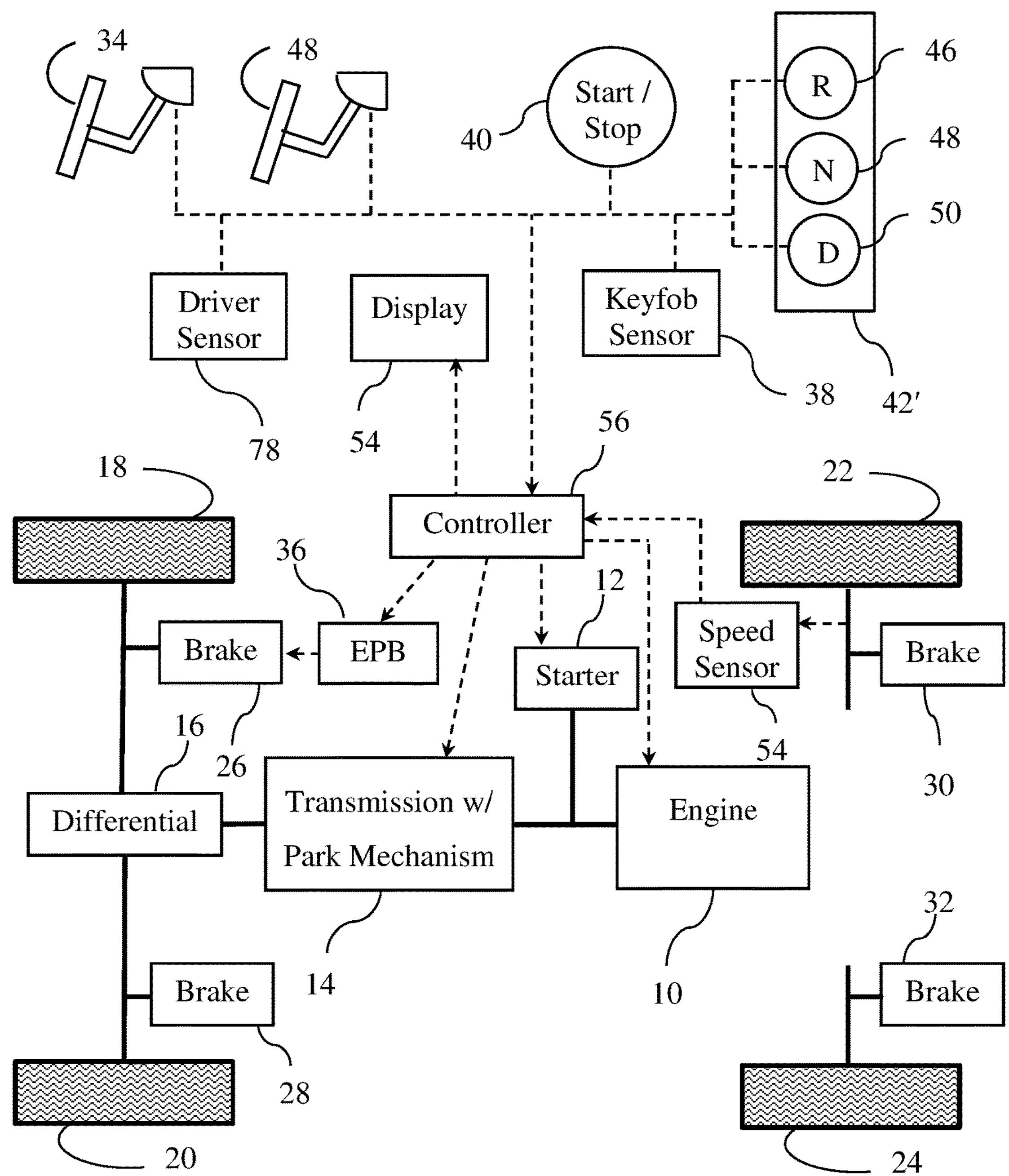
FIG. 3 is a schematic illustration of a vehicle and user interface without a driver manipulatable park control.

FIG. 3 schematically illustrates a modified rear wheel drive vehicle powertrain and driver interface. The driver interface differs from the driver interface of the vehicle of FIG. 1 in several respects. Range selector 42' does not include any feature for direct driver selection of park. Instead, the controller infers when the parking pawl should be engaged based on other information as discussed below. Also, EPB On/Off button 52 is omitted. Controller 56 engages and disengages the Electronic Park Brake in response to manipulation of other controls as described below. Finally, a driver presence sensor 78 detects the presence of a driver in the driver seat. Sensor 78 may, for example, sense weight in the driver seat as is done to sense a front seat passenger to control activation of airbags. Since there are times that a driver may wish to operate the vehicle with the driver door open and/or with a seat belt unbuckled, door sensors and seat belt sensors are not considered driver presence sensors.

Figure 4:
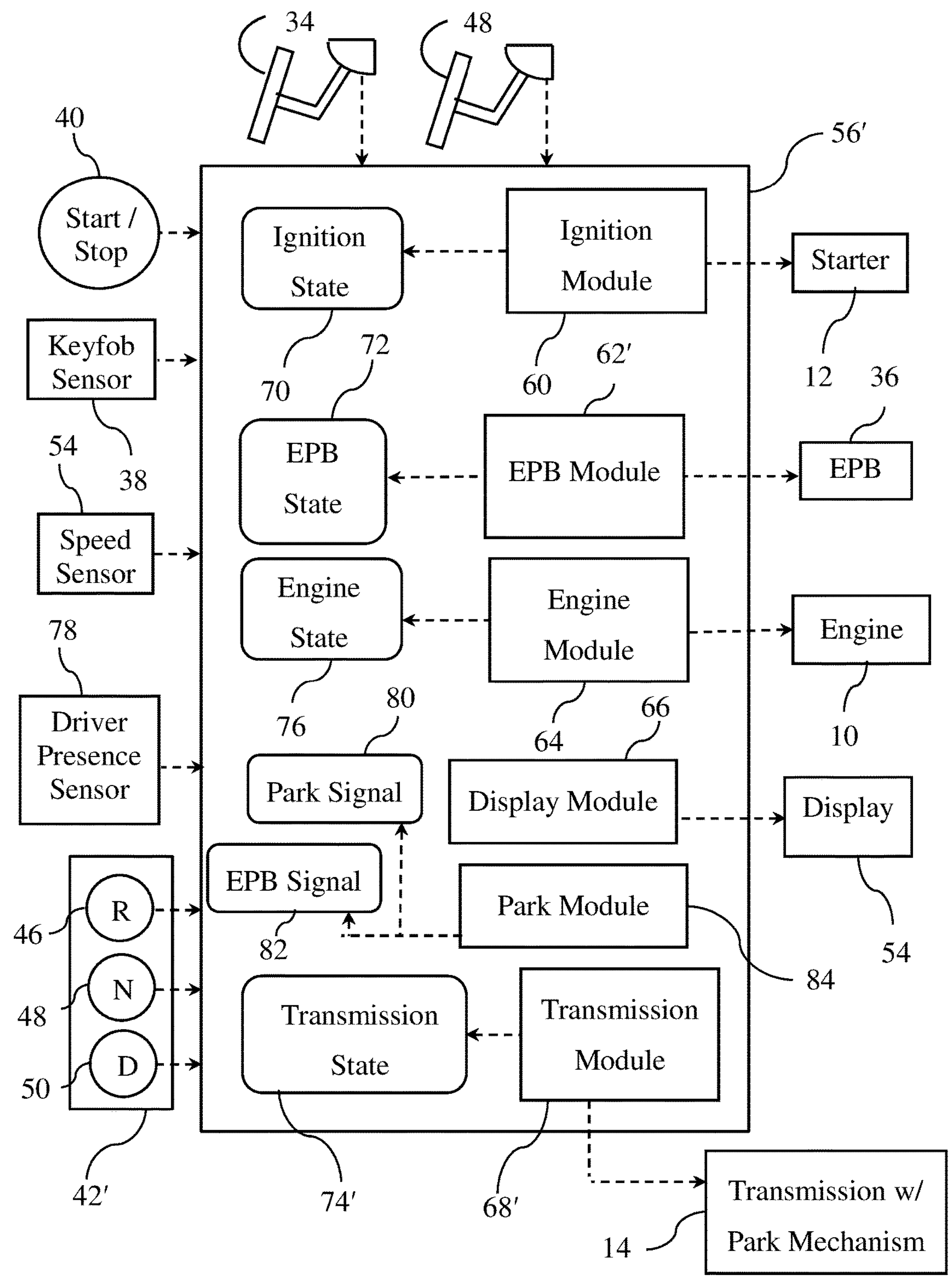
FIG. 4 is a schematic illustration of a logical structure of a controller suitable for use in the vehicle and user interface of FIG. 3.

FIG. 4 schematically illustrates a logical structure for controller 56' of FIG. 3. Ignition module 60, engine module 64, and display module 66 operate in the same way as the corresponding modules of FIG. 2. Transmission module 68' uses the same logic as transmission module 68 of FIG. 2 except that it responds to park signal 80 instead of a user activated P button. In addition to park, neutral, reverse, and forward (or $1^{st}$, $2^{nd}$, $3^{rd}$, etc.) states, transmission module 68' may set transmission state 74' to a stay-in-neutral state. In the stay-in-neutral state, as in the regular neutral state, no power flow path is established through the transmission. However, in the stay-in-neutral state, some features of other control modules operate differently as discussed below. The transmission module 68' may enter the stay-in-neutral state, for example, in response to an additional depression of N button 48 while in the neutral state. EPB module 62' reacts to EPB signal 82 as opposed to reacting to a user activated control. Park signal 80 and EPB signal 82 are set by a new park module 84.

Figure 5:
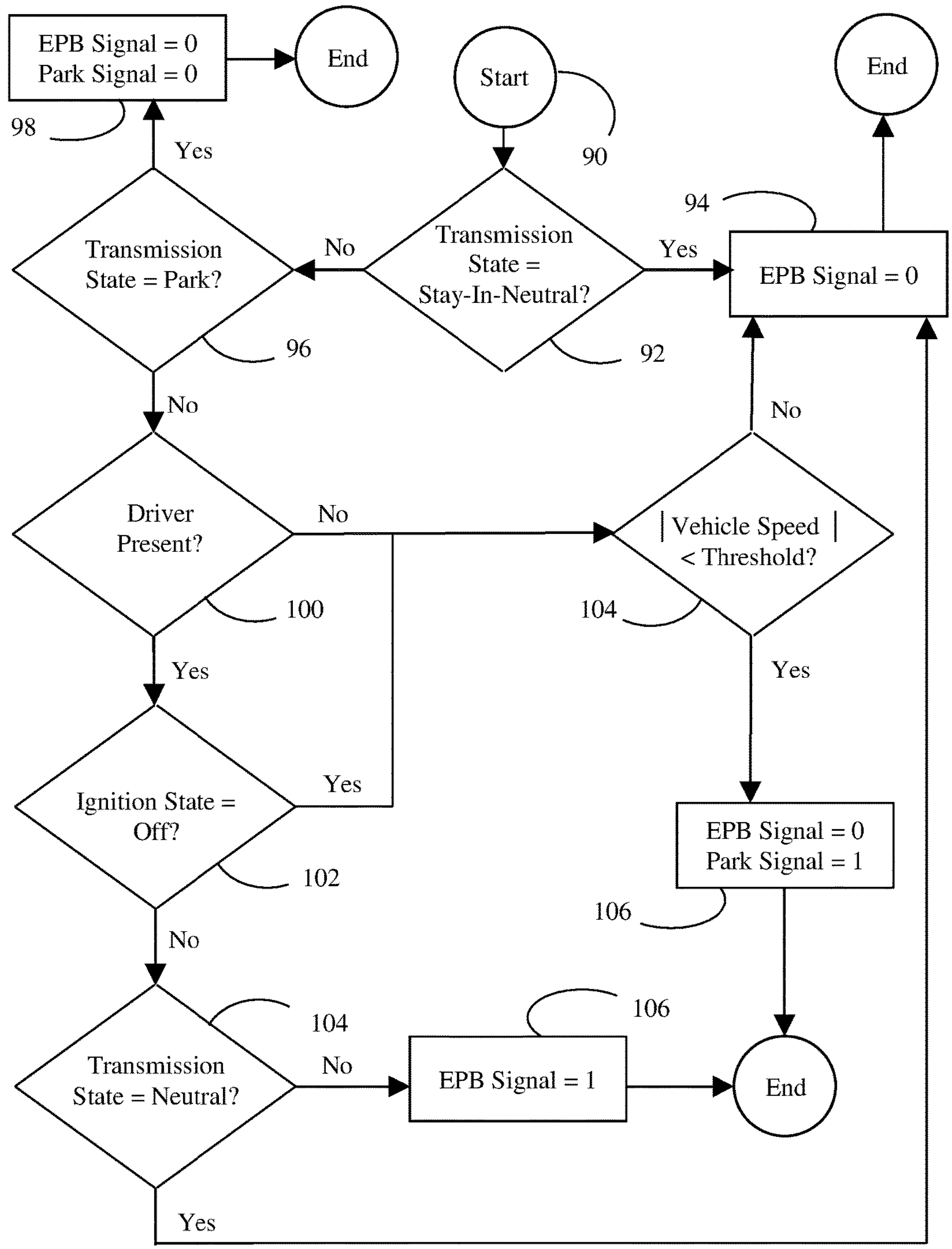
FIG. 5 is a flow chart illustrating operation of the park module of the controller of FIG. 4.

FIG. 5 illustrates exemplary logic for park module 84. This logic is executed at regular intervals whenever the controller is powered. The park module explicitly sets EPB signal 82 to 1 in conditions in which EPB module 62' should execute an automatic hold function as described below and sets EPB signal 82 to 0 in conditions in which the automatic hold function should not be executed. Buttons 46, 48, and 50 generate an input signal that is equal to 1 when the button is pushed and equal to 0 when the button is released. Transmission module 68' reacts to the 0 to 1 transition of these input signals as opposed to reacting to the current state of the input signals. For consistency, park module generates a 0 to 1 transition of internal park signal 80 to indicate to transmission module 68' that park should be engaged. When the park module logic does not explicitly set the park signal, the park signal will continue to have its previously set value. Disengagement of park is triggered by buttons 46, 48, or 50 and not by the park module logic.

The park module logic begins at 90. At 92, the logic checks whether the current transmission state is stay-in-neutral. If so, EPB signal 82 is set to 0 at 94 at the logic terminates. If the transmission state is not stay-in-neutral at 92, the logic checks at 96 whether the transmission state is park. If so, the logic sets both EPB signal 82 and park signal 80 to 0 at 98. If the transmission state is not park at 96, the logic checks at 100 whether a driver is present in the driver's seat based on driver presence sensor 78. If a driver is present, the logic checks at 102 whether the ignition state is Off. If either no driver is present or the ignition state is Off, then the logic checks at 104 whether or not the vehicle is moving. The vehicle is considered stationary if the absolute value of the vehicle speed, according to speed sensor 54, is less than a threshold value. If the vehicle is still moving, EPB signal is set to 0 at 94 and the logic terminates. If the vehicle is moving, the EPB signal is set to 0 and the park signal is set to 1 at 106. If park signal 80 was previously 0, this will trigger engagement of park. If a driver is present at 100 and the ignition is on at 102, then the logic checks whether the transmission state is neutral at 104. If so, the logic sets the EPB signal to 0 at 94 and terminates. If the transmission state is not neutral at 104, the logic determines that the transmission must be in a reverse or forward drive state, having previously determined that the transmission state is not stay-in-neutral or park. If the transmission is in one of the drive states, EPB signal 82 is set to 1 at 106 and the logic terminates.

Figure 6:
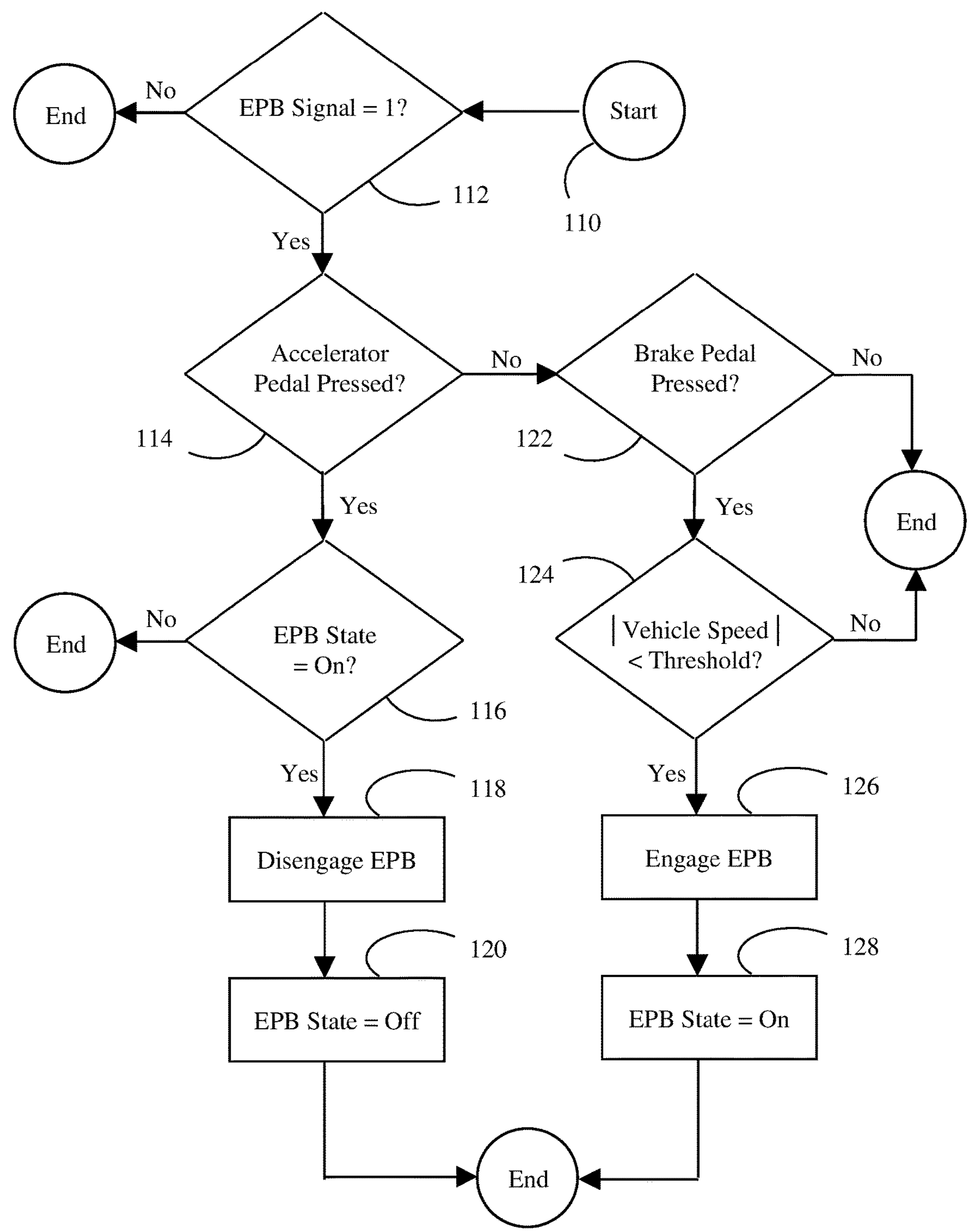
FIG. 6 is a flow chart illustrating operation of the EPB module of the controller of FIG. 4.

FIG. 6 illustrates exemplary logic for implementing an automatic hold feature in EPB module 62'. The automatic hold feature uses the electronic park brake to hold the vehicle stationary after braking to a stop, even if the brake pedal is subsequently released. Then, the EPB is released when the driver presses the accelerator pedal. Creep, in which a vehicle moves slowly when the driver isn't pressing either pedal, is disabled after braking to a stop. If a driver desires creep, it is available by tapping the accelerator pedal briefly.

The logic begins at 110 at regular intervals whenever the controller is powered. The logic checks the EPB signals at 112. If the EPB signal is 0, indicating that the transmission is not in a drive state (reverse or forward), the logic exits. In an alternative embodiment, EPB module 62' may check transmission state directly as opposed to using a signal from park module 84. If the EPB signal is 1 at 112, the logic checks at 114 whether accelerator pedal 48 is pressed. If the accelerator pedal is pressed, indicating that the EPB should be Off, the logic checks at 116 whether the EPB state is on. If the EPB state is already Off at 116, the logic terminates with no further action. If the EPB state is on at 116, the logic disengages the EPB at 118 and sets the EPB state to Off at 120 before terminating. If the accelerator pedal is not pressed at 114, the logic checks at 122 whether brake pedal 34 is pressed. If not, then the logic terminates, leaving the EPB is whatever state it was in previously. If the brake pedal is pressed at 122, the logic checks at 124 whether the vehicle is stationary. If the vehicle is moving at 124, the logic terminates without changing the state of the EPB (which should always be Off in this circumstance). If the vehicle is stationary at 124, the logic engages the EPB at 126 and sets the EPB state to on at 128 before terminating.

The control strategy will now be further illustrated with several sample usage scenarios. First, consider a normal driving scenario. The controller awakens as the driver enters in response to the door opening or keyfob sensor 38 detecting the presence of an authorized driver for example. The ignition state is initially Off, the transmission state is initially park, the EPB state is initially Off. Since the transmission state is parked, park module 84 sets EPB signal 82 and park signal 80 to 0 at 98. Then, the driver presses Start/Stop button 40 while holding brake pedal 34. In response, the ignition controller starts the engine and transitions to On state. While still holding the brake pedal, the driver pushes D button 50. In response, the transmission controller transitions to Forward state, engages clutches to establish first gear, and releases the parking mechanism. In this condition, park module 84 sets EPB signal 82 to 1 at 106. Then, EPB module 62' engages the EPB at 126, implementing the automatic hold feature. Then, the driver releases the brake pedal and presses accelerator pedal 48. In response to the accelerator pedal being pressed, the EPB module releases the EPB. As the vehicle accelerates, the transmission module shifts among the forward gears. As the driver brakes to a stop, for example at a stop light, the EPB controller engages the EPB. The process of engaging and disengaging the EPB may be repeated a number of times as the driver stops and different traffic lights. Upon reaching the destination, the driver pressed Start/Stop button 40. In response, ignition controller shuts Off the engine and changes ignition state to Off. The park module detects this at 102 and sets park signal 80 to 1 at 106, causing the transmission module to engage the parking mechanism, release clutches, and transition to park state. After some period of time, the controller may shut down. The parking pawl holds the vehicle until an authorized driver returns. Note that the driver never explicitly commands engagement or disengagement of the parking mechanism.

As another scenario, consider a driver exiting a vehicle without turning Off the engine. The park module recognizes this at 100 and sets park signal 80 to 1 at 106, causing the transmission module to engage the parking mechanism, release clutches, and transition to park state. If the vehicle is moving, the park module will wait until the vehicle stops to command engagement of park.

As a third scenario, consider a vehicle owner that wishes to tow the vehicle behind another vehicle such as a motorhome. After hitching the vehicle to the tow vehicle, the driver enters the vehicle and presses the Start/Stop button without depressing the brake pedal. In response, the ignition controller transitions to Accessory state. The driver presses N button 48 twice causing the transmission controller to transition into Stay-In-Neutral state. In response to the first press, the transmission module releases the park mechanism. Then, the driver exits the vehicle. Because the transmission state is Stay-In-Neutral at 92, the park module logic does reach 106 to command engagement of park. The park mechanism remains disengaged while the vehicle is towed. Upon reaching the destination, the driver re-enters the towed vehicle and again presses the N button. In response, the transmission controller transitions into Neutral state. When the driver either leaves the vehicle or turns the ignition Off via Start/Stop button 40, the park module logic commands a transition into park at 106.

Note that, in normal driving situations, park is engaged automatically without any explicit action from the driver. Therefore, there is no risk of a driver forgetting to engage park. In the unusual circumstances in which a driver may not want park engaged, the stay-in-neutral feature provides a mechanism to over-ride the default behavior. In vehicle with a user interface that includes a driver manipulateable park feature, a driver may engage park while sitting in the vehicle with the ignition on. For example, this may be desired while waiting for a passenger in weather in which running the heater is desired. With the user interface described above, comparable behavior is provided by the EPB and the automatic hold feature. This feature is activated without explicit driver command in situations where it would ordinarily be desired. In the rare situations in which the feature is not desired, the driver can over-ride the default behavior by engaging neutral or by tapping the accelerator pedal.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:

an automatic transmission;

a range selector providing for driver selection of a neutral mode and a drive mode, but not providing for direct driver selection of any park mode; and a controller programmed to automatically engage a park mechanism in response to selection of an ignition Off state via a driver actuated ignition control and to release the park mechanism in response to selection of the drive mode.

2. The vehicle of claim 1 further comprising a driver presence sensor and wherein the controller is further programmed to automatically engage the park mechanism in response to detecting the absence of a driver.

3. The vehicle of claim 1 wherein the controller is further programmed to inhibit the engagement of the park mechanism in response to driver selection of a stay-in-neutral mode via the range selector.

4. The vehicle of claim 1 further comprising an electrically actuated park brake and wherein the controller is further programmed to engage the park brake in response to the vehicle stopping while in the drive mode.

5. The vehicle of claim 4 wherein the controller is further programmed to inhibit the engagement of the electrically actuated park brake in response to driver selection of a stay-in-neutral mode via the range selector.

6. The vehicle of claim 1 wherein the controller is further programmed to, in response to selection of the ignition Off state while the vehicle is moving, delay engagement of the park mechanism until a vehicle speed decreases to less than a threshold.

7. The vehicle of claim 1 wherein the drive mode is a reverse drive mode and the range selector also provides for driver selection of a forward drive mode.

8. The vehicle of claim 7 wherein the range selector consists of:

a reverse selection button;

a neutral selection button; and a forward selection button.

9. A vehicle driver interface comprising:

a driver-operable range selector providing for direct selection of a forward drive mode, a reverse drive mode, and a neutral mode, but not providing for direct selection of a park mode; and a driver-operable ignition control configured to transition between an ignition on state and an ignition Off state; and a controller programmed to establish the park mode in response to a transition into the ignition Off state and in response to detecting the absence of a driver.

10. The vehicle driver interface of claim 9 wherein the controller is further programmed to engage an electronic park brake in response to the vehicle stopping while in the drive mode.

11. The vehicle driver interface of claim 9 wherein the controller is further programmed to, in response to selection of the ignition Off state while the vehicle is moving, delay engagement of the park mode until a vehicle speed decreases to less than a threshold.

12. A vehicle comprising:

an automatic transmission including a park mechanism;

an electronic park brake;

a driver actuated ignition control;

a range selector providing for driver selection of a neutral mode, a forward drive mode, and a reverse drive mode, but not providing for direct driver selection of any park mode; and a controller programmed to automatically engage the park mechanism in response to selection of an ignition Off state via the driver actuated ignition control, and to engage the electronic park brake in response to the vehicle stopping while in the drive mode.

13. The vehicle of claim 12 further comprising a driver presence sensor and wherein the controller is further programmed to automatically engage the park mechanism in response to detecting the absence of a driver.

14. The vehicle of claim 12 wherein the controller is further programmed to inhibit the engagement of the park mechanism in response to driver selection of a stay-in-neutral mode via the range selector.

15. The vehicle of claim 12 wherein the controller is further programmed to, in response to selection of the ignition Off state while the vehicle is moving, delay engagement of the park mechanism until a vehicle speed decreases to less than a threshold.

* * * * *